United States Patent
Maezawa

(10) Patent No.: US 11,348,561 B2
(45) Date of Patent: May 31, 2022

(54) PERFORMANCE CONTROL METHOD, PERFORMANCE CONTROL DEVICE, AND PROGRAM

(71) Applicant: Yamaha Corporation, Shizuoka (JP)

(72) Inventor: Akira Maezawa, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 212 days.

(21) Appl. No.: 16/800,993

(22) Filed: Feb. 25, 2020

(65) Prior Publication Data
US 2020/0193948 A1    Jun. 18, 2020

Related U.S. Application Data

(63) Continuation of application No. PCT/JP2018/032579, filed on Sep. 3, 2018.

(30) Foreign Application Priority Data

Sep. 22, 2017    (JP) .............................. JP2017-182246

(51) Int. Cl.
  *G10H 1/00*    (2006.01)
  *G06F 9/54*    (2006.01)

(52) U.S. Cl.
  CPC ........... *G10H 1/0033* (2013.01); *G06F 9/542* (2013.01); *G10H 1/0008* (2013.01); *G10H 2210/076* (2013.01); *G10H 2210/091* (2013.01); *G10H 2240/085* (2013.01)

(58) Field of Classification Search
  CPC .......... G10H 1/0033; G10H 2210/076; G10H 2210/091; G10H 2240/085; G10H 1/0008; G06F 9/542

USPC .......................................................... 84/601
See application file for complete search history.

(56) References Cited

U.S. PATENT DOCUMENTS

| | | | | |
|---|---|---|---|---|
| 6,429,366 B1 * | 8/2002 | Terada | ................... | G11B 20/12 84/645 |
| 7,006,881 B1 * | 2/2006 | Hoffberg | .............. | G06V 40/103 709/200 |
| 8,148,621 B2 * | 4/2012 | Bright | .................... | G10H 1/366 84/649 |
| 9,041,784 B2 * | 5/2015 | Rivera | ............... | H04N 21/2543 348/61 |

(Continued)

FOREIGN PATENT DOCUMENTS

JP    2006201654 A    8/2006
JP    2012532340 A  * 12/2012
(Continued)

OTHER PUBLICATIONS

International Search Report in PCT/JP2018/032579, dated Nov. 20, 2018.

*Primary Examiner* — Christina M Schreiber
(74) *Attorney, Agent, or Firm* — Global IP Counselors, LLP

(57) ABSTRACT

A reproduction control method realized by a computer includes analyzing an actual performance of an actual performer, controlling a reproduction of a performance sound of a musical piece represented by music data in accordance with a result of the analyzing of the actual performance, and outputting a message relating to the actual performance in accordance with the result of the analyzing of the actual performance.

17 Claims, 4 Drawing Sheets

(56) References Cited

U.S. PATENT DOCUMENTS

| | | | |
|---|---|---|---|
| 9,064,484 B1* | 6/2015 | Jaaskelainen | G10H 1/361 |
| 9,292,166 B2* | 3/2016 | Rivera | G07F 17/305 |
| 10,646,750 B2* | 5/2020 | Crankson | A43C 19/00 |
| 2002/0166437 A1* | 11/2002 | Nishitani | G10H 1/0008 |
| | | | 84/600 |
| 2003/0110925 A1* | 6/2003 | Sitrick | G09B 15/002 |
| | | | 84/477 R |
| 2006/0117935 A1* | 6/2006 | Sitrick | G10G 1/00 |
| | | | 84/477 R |
| 2011/0003638 A1* | 1/2011 | Lee | G10H 1/368 |
| | | | 463/43 |
| 2012/0295679 A1* | 11/2012 | Izkovsky | A63F 13/814 |
| | | | 463/7 |
| 2015/0046824 A1* | 2/2015 | Humphrey | G10H 1/0058 |
| | | | 715/727 |
| 2017/0256246 A1* | 9/2017 | Maezawa | G10G 1/00 |
| 2020/0193948 A1* | 6/2020 | Maezawa | G10G 1/00 |

FOREIGN PATENT DOCUMENTS

| | | | |
|---|---|---|---|
| JP | 2012532340 A | | 12/2012 |
| JP | 2015079183 A | * | 4/2015 |
| JP | 2015079183 A | | 4/2015 |
| JP | 2015194767 A | | 11/2015 |
| JP | 2016099512 A | | 5/2016 |

\* cited by examiner

PERFORMANCE CONTROL METHOD, PERFORMANCE CONTROL DEVICE, AND PROGRAM

CROSS-REFERENCE TO RELATED APPLICATIONS

This application is a continuation application of International Application No. PCT/JP2018/032579, filed on Sep. 3, 2018, which claims priority to Japanese Patent Application No. 2017-182246 filed in Japan on Sep. 22, 2017. The entire disclosures of International Application No. PCT/JP2018/032579 and Japanese Patent Application No. 2017-182246 are hereby incorporated herein by reference.

BACKGROUND

Technological Field

The present invention relates to technology for controlling the reproduction of a musical piece.

Background Information

A technique (score alignment) for analyzing the position in a musical piece that is being played by a performer (hereinafter referred to as "performance position") has been proposed in the prior art. For example, Japanese Laid-Open Patent Application No. 2016-099512 discloses a technique for estimating the performance position from a performance sound of a musical piece that a performer has actually played and controlling the reproduction of the performance sound of an accompaniment part so as to be synchronized with the progress of the performance position. In addition, Japanese Laid-Open Patent Publication No. 2006-201654 discloses a technique to cause the key and tempo of the accompaniment sound to follow the performer's performance.

However, if the reproduction of the accompaniment part is simply synchronized with the actual performance of the performer, the performer cannot sufficiently be given the feeling of performing in concert with another person.

SUMMARY

In consideration of the circumstances described above, an object of this disclosure is to impart the feeling of actually playing (for example, performing) with another virtual performer.

In order to solve the problem described above, a reproduction control method according to a preferred aspect of this disclosure, includes analyzing an actual performance of an actual performer, controlling a reproduction of a performance sound of a musical piece represented by music data in accordance with a result of the analyzing of the actual performance, and outputting a message relating to the actual performance in accordance with the result of the analyzing of the actual performance.

In addition, a reproduction control device according to a preferred aspect of this disclosure comprises an electronic controller including at least one processor. The electronic controller is configured to execute a plurality of modules including an analysis processing module that analyzes an actual performance of an actual performer, a reproduction control module that causes a sound output device to reproduce a performance sound of a musical piece represented by music data and that controls a reproduction of the performance sound in accordance with a result of analysis by the analysis processing module, and an output processing module that outputs a message relating to the actual performance in accordance with the result of the analysis by the analysis processing module.

A non-transitory computer readable medium storing a program according to a preferred aspect of this disclosure causes a computer to execute an analysis process that analyzes an actual performance of an actual performer, a reproduction control process that causes a sound output device to reproduce a performance sound of a musical piece represented by music data and that controls a reproduction of the performance sound in accordance with a result of analysis by the analysis process, and an output process that outputs a message relating to the actual performance in accordance with the result of the analysis by the analysis process.

DETAILED DESCRIPTION OF THE EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

First Embodiment

Figure 1:
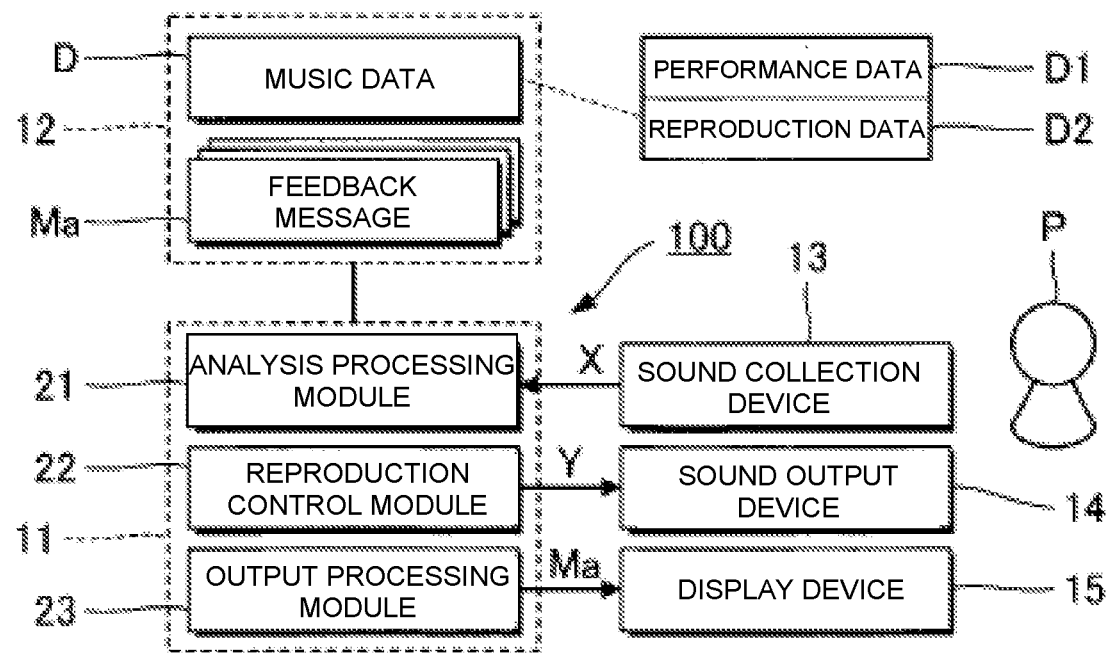
FIG. 1 is a block diagram of a reproduction control device according to a first embodiment.

FIG. 1 is a block diagram illustrating a configuration of a reproduction control device 100 according to a first embodiment. A performer P that uses the reproduction control device 100 performs a specific part (hereinafter referred to as "performance part") of a musical piece using a musical instrument. The reproduction control device 100 reproduces the performance sound of another part (hereinafter referred to as "reproduction part") of the musical piece in parallel with the performance of the performance part by the performer P. The performance part is the main melody part of the musical piece, for example, and the reproduction part is an accompaniment part of said musical piece, for example. Thus, the performer P performs the performance part with the feeling of playing said musical piece in concert with a virtual performer (hereinafter referred to as "virtual performer") who is in charge of the reproduction part of the musical piece. The operation in which the reproduction control device 100 reproduces the performance sound of the reproduction part is hereinafter referred to as "reproduction operation." The performance part and the reproduction part can be a common part of the musical piece.

The reproduction control device 100 according to the first embodiment sequentially displays a message corresponding to the result of analyzing the performance of the performer P (hereinafter referred to as "feedback message") in parallel with the reproduction operation. The feedback message is a character string representing an emotion that the virtual performer has concerning the performance of the performer P and is reported to the performer P as a remark or feeling of the virtual performer.

As illustrated in FIG. 1, the reproduction control device 100 according to the first embodiment comprises an electronic controller 11, a storage device 12, a sound collection device 13, a sound output device 14, and a display device 15. The term "electronic controller" as used herein refers to hardware that executes software programs. The electronic controller 11 includes a processing circuit, such as a CPU (Central Processing Unit) having at least one processor, and comprehensively controls each of the elements (storage device 12, sound collection device 13, sound output device 14, and display device 15) that constitute the reproduction control device 100.

The storage device 12 is configured from a known storage medium, such as a magnetic storage medium or a semiconductor storage medium, or from a combination of a plurality of types of storage media, and stores a program that is executed by the electronic controller 11 and various data that are used by the electronic controller 11. In other words, the storage device 12 is any computer storage device or any computer readable medium with the sole exception of a transitory, propagating signal. For example, the storage device 12 can be a computer memory device which can be nonvolatile memory and volatile memory. Moreover, the storage device 12 that is separate from the reproduction control device 100 (for example, cloud storage) can be prepared, and the electronic controller 11 can read from or write to the storage device 12 via a communication network, such as a mobile communication network or the Internet. That is, the storage device 12 may be omitted from the reproduction control device 100.

The storage device 12 of the first embodiment stores music data D that represent the content of the musical piece (that is, a score). As shown in FIG. 1, the music data D are composed of performance data D1 and reproduction data D2. The performance data D1 designate the content of the performance part that is performed by the performer P (for example, a sequence of notes that constitute the performance part). On the other hand, the reproduction data D2 designate the content of the reproduction part that is reproduced by the reproduction control device 100 (for example, a sequence of notes that constitute the reproduction part). Each of the performance data D1 and the reproduction data D2 are MIDI (Musical Instrument Digital Interface) format time-series data, in which are arranged, in a time series, instruction data indicating, for example, sound generation or muting, and time data indicating the generation time point of said instruction data. The instruction data assign, for example, pitch and intensity, and provide instruction for operations such as sound generation and muting. The time data designate, for example, an interval for successive instruction data.

The storage device 12 stores a plurality of feedback messages Ma. Specifically, the plurality of feedback messages Ma that express different emotions of the virtual performer are stored in the storage device 12. Identification information is appended to each of the plurality of feedback messages Ma. From the plurality of feedback messages Ma stored in the storage device 12, the feedback message Ma that is selected in accordance with the performance by the performer P is output to the performer P.

The sound collection device 13 collects the performance sound generated from the musical instrument in the performance by the performer P and generates an audio signal X representing a waveform of said performance sound. For example, a microphone is suitably employed as the sound collection device 13. The audio signal X that is output from an electric musical instrument, such as an electric string instrument, can also be used. Therefore, the sound collection device 13 may be omitted. An illustration of an A/D converter that converts the audio signal X generated by the sound collection device 13 from analog to digital is omitted for the sake of convenience.

The display device 15 is a display that displays various images under the control of the electronic controller 11. For example, a liquid-crystal display panel or an organic EL (Electroluminescent) display panel is suitably employed as the display device 15. The display device 15 according to the first embodiment displays the feedback message Ma. The sound output device 14 (a speaker or headphones) reproduces sound as instructed by the reproduction control device 100. The sound output device 14 according to the first embodiment reproduces the performance sound of the reproduction part under the control of the reproduction control device 100.

The electronic controller 11 has a plurality of functions and functions as a plurality of modules, which include an analysis processing module 21, a reproduction control module 22, and an output processing module, 23 for realizing the reproduction of the reproduction part of the musical piece and the output of the feedback message Ma by means of the execution of a program that is stored in the storage device 12. Moreover, the functions of the electronic controller 11 can be realized by a group of a plurality of devices (that is, a system), or some or all of the functions of the electronic controller 11 can be realized by a dedicated electronic circuit.

The analysis processing module 21 analyzes the performance of the performance part by the performer P. Specifically, by analyzing the audio signal X generated by the sound collection device 13, the analysis processing module 21 calculates the position at which the performer P is playing (hereinafter referred to as "performance position") Q1, the speed of the performance by the performer P (hereinafter referred to as "performance speed") Q2, and an index of the skill level of the performance by the performer P (hereinafter referred to as "evaluation index") Q3. The calculation of each of the indices (Q1-Q3) by the analysis processing module 21 is sequentially repeated (that is, at a plurality of different time points) in parallel with the performance by the performer P. The performance position Q1 is an example of a "first index," the performance speed Q2 is an example of a "second index," and the evaluation index Q3 is an example of a "third index."

The analysis processing module 21 of the first embodiment calculates the performance position Q1 by crosschecking the audio signal X and the performance data D1 of the music data D (that is, the performance content of the performance part). A known analytical technology (score alignment technology) can be freely employed for the estimation of the performance position Q1 by the analysis processing module 21. For example, the analytical technique disclosed in Japanese Laid-Open Patent Application No. 2016-099512 can be used for estimating the performance position Q1. In addition, an identification model such as a neural network or a k-ary tree can be used for estimating the performance position Q1. For example, the identification model is generated by machine learning (for example, deep learning) that uses the feature amount of numerous performance sounds as the teacher data. The analysis processing module 21 estimates the performance position Q1 by applying the feature amount extracted from the audio signal X to the learned identification model. In addition, the analysis processing module 21 calculates the temporal change in the performance position Q1 as the performance speed Q2 (tempo).

In addition, the analysis processing module 21 calculates the evaluation index Q3 corresponding to the degree of similarity between the performance represented by the audio signal X and the performance represented by the performance data D1 (that is, an exemplary performance). Specifically, the analysis processing module 21 calculates the evaluation index Q3, which represents the suitability at the time point at which the performer P plays each note, by evaluating the temporal error of the sound generation time point of each note between the performance represented by the audio signal X and the performance represented by the performance data D1. For example, a case is assumed in which the evaluation index Q3 takes on a larger numerical value as the error of the sound generation time point of each note between the performance represented by the audio signal X and the performance represented by the performance data D1 decreases (as the performance time point of each note by the performer P is closer to the exemplary performance). An index calculated in the process of estimating the performance position Q1 (for example, the likelihood of the performance position Q1) can also be used as the evaluation index Q3.

The reproduction control module 22 in FIG. 1 causes the sound output device 14 to reproduce the performance sound of the reproduction part represented by the reproduction data D2 of the music data D. That is, the reproduction control module 22 causes the sound output device 14 to execute the reproduction operation of the reproduction part. Specifically, the reproduction control module 22 generates an audio signal Y that represents the waveform of each note of the reproduction part designated by the reproduction data D2 and supplies the audio signal to the sound output device 14. A known audio generation process (for example, a software sound source) is freely employed for the generation of the audio signal Y corresponding to the reproduction data D2. The reproduction control module 22 can also cause a sound source circuit such as a MIDI sound source to generate the audio signal Y. An illustration of a D/A converter that converts the audio signal Y generated by the reproduction control module 22 from digital to analog is omitted for the sake of convenience.

The reproduction control module 22 of the first embodiment controls the reproduction operation by the sound output device 14 in accordance with the result of the analysis of the performance of the performer P by the analysis processing module 21. Specifically, the reproduction control module 22 generates the audio signal Y such that the reproduction operation follows the progress of the performance position Q1 estimated by the analysis processing module 21. For example, the reproduction control module 22 increases the reproduction speed (tempo) of the reproduction part when the progress of the performance position Q1 is fast (that is, when the performance speed Q2 is fast), and decreases the reproduction speed of the reproduction part when the progress of the performance position Q1 is slow. That is, the reproduction operation of the reproduction part is executed at a performance speed that is equivalent to that of the performance by the performer P so as to synchronize with the progress of the performance position Q1 (movement on a time axis). Thus, the performer P can perform the performance part with the feeling as if the virtual performer were performing the reproduction part in concert with the performance of the performer.

Figure 2:
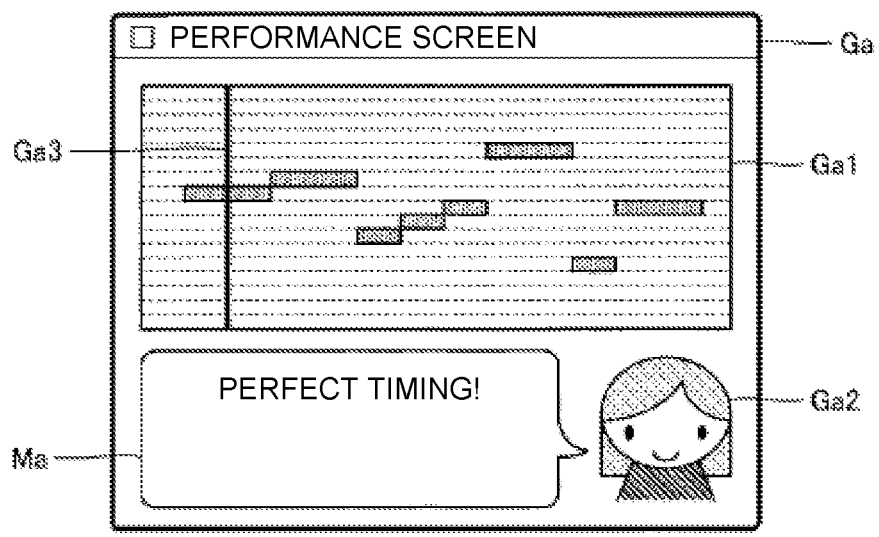
FIG. 2 is a schematic diagram of a performance screen.

The output processing module 23 causes the display device 15 to display the feedback message Ma. The output processing module 23 of the first embodiment causes the display device 15 to display a performance screen Ga of FIG. 2. As shown in FIG. 2, the performance screen Ga is an image that includes a score region Ga1, a performer screen Ga2, and the feedback message Ma. A time series of a plurality of notes of the performance part indicated by the performance data D1 is displayed in the score region Ga1 on a coordinate plane that includes a pitch axis and a time axis (that is, a piano roll display). In addition, an indicator Ga3 that indicates the performance position Q1 is displayed in the score region Ga1 and moves on the time axis in conjunction with the performance by the performer P (that is, the progress of the performance position Q1). The performer screen Ga2 is an image representing the virtual performer (character).

Figure 3:
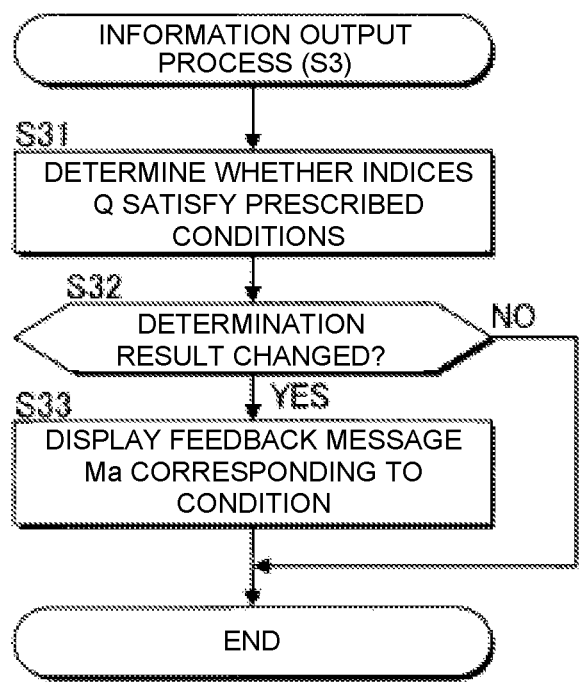
FIG. 3 is a flowchart of an information output process.

The feedback message Ma is displayed in a balloon representing that the message is the virtual performer's statement. The output processing module 23 causes the display device 15 to display, from the plurality of feedback messages Ma stored in the storage device 12, the feedback message Ma corresponding to the result of the analysis processing module 21 analyzing the performance of the performer P. FIG. 3 is a flowchart illustrating the process in which the output processing module 23 causes the display device 15 to display the feedback message Ma (hereinafter referred to as "information output process"). The information output process is repeated at a prescribed period.

When the information output process is started, the output processing module 23 determines whether the indices Q (Q1-Q3) calculated by the analysis processing module 21 have satisfied prescribed conditions (S31). The output processing module 23 of the first embodiment determines whether the indices Q are within prescribed ranges. Specifically, the output processing module 23 determines whether the performance speed Q2 is a numerical value within a prescribed range and determines whether the evaluation index Q3 exceeds a prescribed threshold value T3. The output processing module 23 determines whether the determination result regarding the indices Q has changed (S32). If the determination result has changed (S32: YES), the output processing module 23 causes the display device 15 to display, from the plurality of feedback messages Ma stored in the storage device 12, the feedback message Ma corresponding to the condition for which the determination result changed (S33). Specifically, the output processing module 23 generates the identification information corresponding to the condition for which the determination result has changed, selects the feedback message Ma corresponding to said identification information from the storage device 12, and causes the display device 15 to display the message. As can be understood from the foregoing explanation, each time there is a change in the result of determining whether the indices Q satisfy the prescribed conditions, the feedback message Ma corresponding to said condition is displayed on the display device 15. Thus, there is the advantage that the performer P can promptly correct the performer's own performance.

For example, if the performance speed Q2 has changed from a numerical value within a prescribed range (hereinafter referred to as "standard range") to a numerical value exceeding an upper limit value of the standard range, the output processing module 23 causes the display device 15 to display the feedback message Ma "Too fast!" which means that the performance speed Q2 is fast. If the performance speed Q2 has changed from a numerical value within the standard range to a numerical value falling below a lower limit value of the standard range, the output processing module 23 causes the display device 15 to display the feedback message Ma "Too slow!" which means that the performance speed Q2 is slow. On the other hand, if the performance speed Q2 has changed from a numerical value outside of the standard range to a numerical value inside of the standard range, the output processing module 23 causes the display device 15 to display the feedback message Ma "Appropriate tempo!" which means that the performance speed Q2 is appropriate. As can be understood from the foregoing explanation, the feedback message Ma that is displayed on the display device 15 is information that guides the performer P such that the performance speed Q2 of the performer P becomes a numerical value within the standard range.

In addition, if the evaluation index Q3 has changed from a numerical value below a prescribed threshold value to a numerical value exceeding said threshold value, the output processing module 23 causes the display device 15 to display the feedback message Ma "Perfect timing!" which means that the performance time point of each note is appropriate. On the other hand, if the evaluation index Q3 has changed from a numerical value exceeding the prescribed threshold value to a numerical value below said threshold value, the output processing module 23 causes the display device 15 to display the feedback message Ma "Timing is off!" which means that the performance time point of each note is shifted.

The feedback messages Ma illustrated above are displayed on the display device 15 for a prescribed period of time (hereinafter referred to as "display duration") each time there is a change in the result of determining whether the indices Q satisfy the prescribed conditions (S31), and are deleted from the performance screen Ga after the lapse of the display duration. For example, the above-mentioned feedback message "Too fast!" is displayed on the display device 15 at the point in time at which the performance speed Q2 changes from a numerical value within the prescribed range to a numerical value exceeding the upper limit value of said range and is deleted from the performance screen Ga at the point in time at which the display duration has elapsed from the start of display. Similarly, for example, the above-mentioned feedback message Ma "Perfect timing!" is displayed on the display device 15 at the point in time at which the evaluation index Q3 changes from a numerical value below the prescribed threshold value to a numerical value exceeding said threshold value and is deleted from the performance screen Ga at the point in time at which the display duration has elapsed from the start of display.

Figure 4:
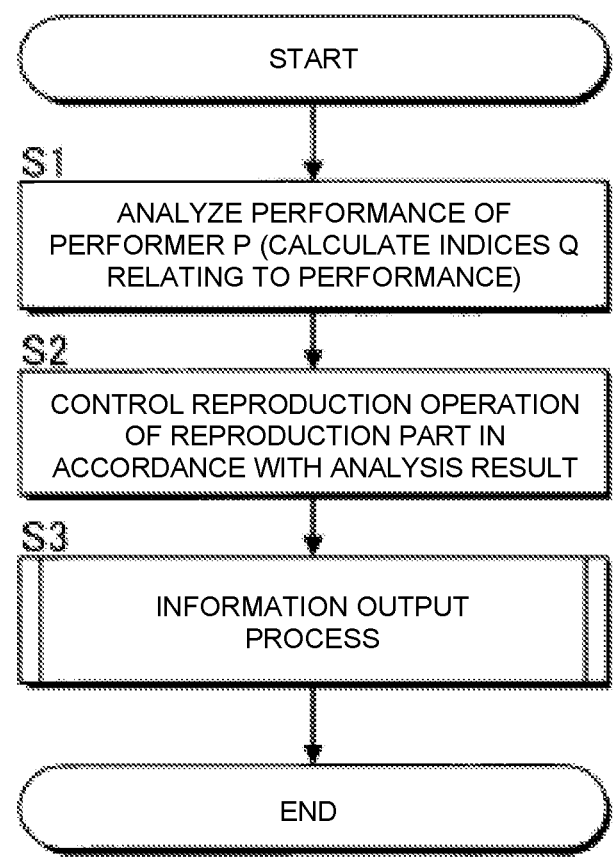
FIG. 4 is a flowchart illustrating an operation of a reproduction control device.

FIG. 4 is a flowchart illustrating an operation (one example of the reproduction control method) of the control device 100. For example, the process of FIG. 4 is repeated at a prescribed period. When the process of FIG. 4 is started, the analysis processing module 21 analyzes the performance of the performance part by the performer P (51). Specifically, by analyzing the audio signal X generated by the sound collection device 13, the analysis processing module 21 calculates the performance position Q1, the performance speed Q2 and the evaluation index Q3.

The reproduction control module 22 controls the reproduction operation in accordance with the result of the analysis of the performance of the performer P by the analysis processing module 21, while causing the sound output device 14 to execute the reproduction operation of the reproduction part represented by the reproduction data D2 (S2). Specifically, the reproduction control module 22 generates the audio signal Y such that the reproduction operation of the reproduction part follows the progress of the performance position Q1. On the other hand, the output processing module 23 causes the display device 15 to display the feedback message Ma relating to the performance by the performer P in accordance with the result of the analysis by the analysis processing module 21 by means of the information output process of FIG. 3 (S3). By means of the repetition of the process described above being repeated at the prescribed period, the feedback message Ma is displayed as needed in parallel with the performance of the musical piece by the performer P. The order of the control of the reproduction operation (S2) and the display of the feedback message Ma (S3) can be reversed.

As described above, in the first embodiment, not only is the reproduction of the performance sound controlled in accordance with the result of analyzing the performance by the performer P, but also the feedback message Ma corresponding to said analysis result is output. Thus, it is possible to impart to the performer P the feeling of performing in concert with another virtual performer. In addition, since the analysis result is used for both the control of the reproduction of the performance sound and the output of the feedback message Ma, there is the advantage that the process is simplified relative to a configuration in which separate processes are necessary for the control of the reproduction of the performance sound and the output of the feedback message Ma.

Second Embodiment

The second embodiment will now be described. In each of the embodiments illustrated below, elements that have the same actions or functions as in the first embodiment have been assigned the same reference symbols as those used to describe the first embodiment and detailed descriptions thereof have been appropriately omitted.

In the first embodiment, the feedback message Ma is displayed in parallel with the reproduction operation of the reproduction part. In the second embodiment, in addition to the display of the feedback message Ma in parallel with the reproduction operation in the same manner as in the first embodiment, a message representing a general comment of the performance of the entire musical piece (hereinafter referred to as "general comment message") is displayed after the performance of the musical piece is completed. The display of the feedback message Ma exemplified in the first embodiment may be omitted in the second embodiment.

Figure 5:
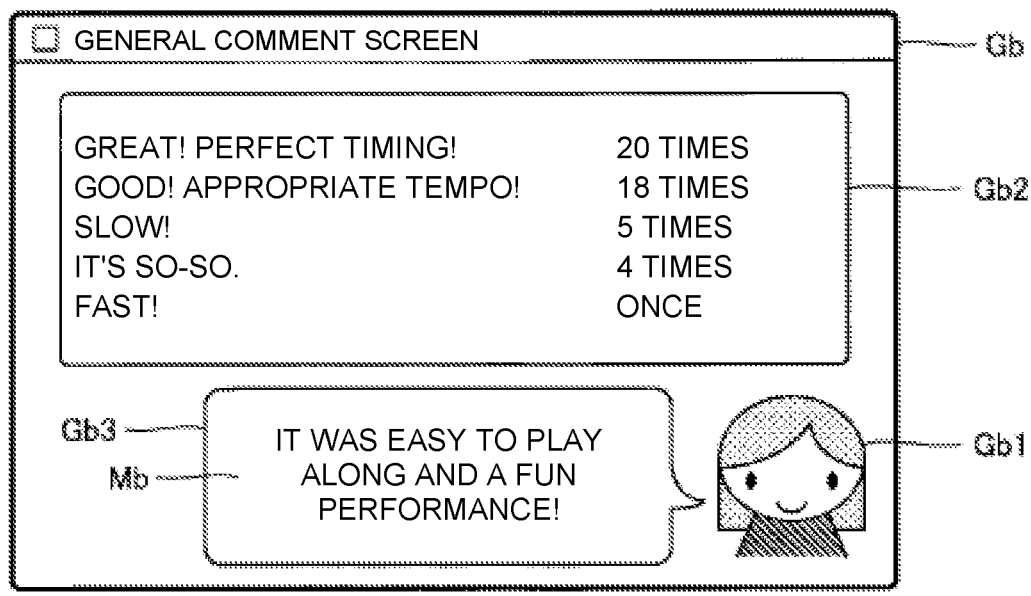
FIG. 5 is a schematic diagram of a general comment screen.

The output processing module 23 of the second embodiment causes the display device 15 to display a general comment screen Gb of FIG. 5 when the performance of the musical piece ends. The general comment screen Gb is configured to include a performer screen Gb1, a tally region Gb2, and an evaluation region Gb3. The performer screen Gb1 is an image representing the virtual performer.

The tally region Gb2 is a region in which feedback messages Ma that were frequently displayed during the performance are arranged. Specifically, a prescribed number of the feedback messages Ma that are ranked near the top of a list that is in descending order of the number of times of display is displayed in the tally region Gb2 together with the number of times of display. The performer P can check the tendencies of the performer's own performance by viewing the tally region Gb2.

A plurality of general comment messages Mb are stored in the storage device 12 of the second embodiment. The identification information of the feedback message Ma is appended to each of the plurality of general comment messages Mb. Of the feedback messages Ma that are displayed on the display device 15 during the performance of the musical piece, the general comment message Mb corresponding to the most frequent feedback messages Ma is made to be displayed on the display device 15 by the output processing module 23. That is, the general comment message Mb is a character string representing an emotion that the virtual performer has about the performance tendency of the performer P with regard to the entire musical piece. For example, if the feedback message Ma "Perfect timing!" was the most frequent message during the performance of the musical piece, as shown in FIG. 5, the general comment message Mb "It was easy to play along and a fun performance!" is displayed in the evaluation region Gb3.

The same effects as those of the first embodiment are realized in the second embodiment. In addition, in the second embodiment, since the general comment message Mb, which represents the general comment regarding the performance of the entire musical piece, is displayed on the display device 15, there is the advantage that the performer P can ascertain the tendencies of the performance of the entire musical piece.

Modified Examples

Specific modified embodiments to be added to each of the embodiments exemplified above are illustrated below. Two or more embodiments arbitrarily selected from the following examples can be appropriately combined as long as they are not mutually contradictory.

(1) In the embodiments described above, the analysis processing module 21 calculates the performance position Q1, the performance speed Q2, and the evaluation index Q3, but the indices Q to be calculated by the analysis processing module 21 regarding the performance by the performer P are not limited to the foregoing examples. For example, the analysis processing module 21 can calculate an index Q4 of the temporal error (for example, deviation of a beat point) between the performance by the performer P and the performance sound of the reproduction part. For example, when the index Q4 exceeds a prescribed threshold value, the output processing module 23 causes the display device 15 to display the feedback message Ma such as "It's difficult to play along!" and, when the index Q4 falls below the threshold value, causes the display device 15 to display the feedback message Ma such as "Easy to play along!". The index Q4 is an example of a "fourth index." In addition, the analysis processing module 21 can calculate an index Q5 that represents the presence/absence (presence or absence) of a performance mistake by the performer P. For example, if the volume of the audio signal X falls below a prescribed value for a prescribed period of time (when the performance is interrupted due to a performance mistake by the performer P), the index Q5 is set to a numerical value indicating the occurrence of the performance mistake. The index Q5 is an example of a "fifth index."

(2) A configuration can be employed in which the performer P can freely select between activation/deactivation of the information output process for sequentially displaying the feedback message Ma in parallel with the performance by the performer P. When activation of the information output process is selected, in the same manner as the above-mentioned embodiments, the display of the feedback messages Ma and the reproduction of the performance sounds of the reproduction part are executed in parallel with the performance by the performer P. On the other hand, when deactivation of the information output process is selected, while the reproduction of the performance sounds of the reproduction part is executed in parallel with the performance by the performer P, the display of the feedback message Ma is omitted.

(3) A configuration in which the performer P can select any one of a plurality of the virtual performers is also suitable. The plurality of feedback messages Ma is individually stored for each virtual performer in the storage device 12. The content of each of the feedback messages Ma is different for each virtual performer. The output processing module 23 causes the display device 15 to selectively display the plurality of feedback messages Ma stored in the storage device 12 for the virtual performer selected by the performer P from among a plurality of virtual performers in accordance with the performance of said performer P. Thus, even when the performance of the performer P is similar, when the virtual performer selected by the performer P is different, a separate feedback message Ma is displayed.

(4) In the embodiments described above, the performance of the musical piece by the performer P is analyzed, but the target of analysis by the analysis processing module 21 is not limited to the performance by the performer P. For example, the analysis processing module 21 can analyze the dance of a dancer. Specifically, the analysis processing module 21 estimates, for example, the dancer's rhythm (beat points) by analyzing an output signal from an acceleration sensor attached to the body of the dancer, or from an image capturing device that captures images of the dancer. The reproduction control module 22 causes the sound output device 14 to execute the reproduction operation of the reproduction part represented by the reproduction data D2 and controls the reproduction operation in accordance with the result of the analysis processing module 21 analyzing the dance. Specifically, the reproduction operation is controlled so as to be synchronized with the rhythm of the dancer. The output processing module 22 causes the display device 15 to display the feedback message Ma corresponding to the result of the analysis processing module 21 analyzing the dance. As can be understood from the foregoing explanation, the analysis processing module 21 is comprehensively expressed as an element that analyzes the actual performance of the actual performer. A specific example of an actual performer is the performer P or the dancer, and a specific example of an actual performance is the performance or the dance.

(5) In each of the embodiments described above, the feedback message Ma is displayed on the display device 15, but the method for notifying the user of the feedback message Ma is not limited to the example described above. For example, the performer P can be notified by reproducing a voice uttering the feedback message Ma from the sound output device 14. The voice uttering the feedback message Ma can be stored in the storage device 12 as voice data, or be generated by a known voice synthesis technology. As can be understood from the foregoing explanation, the output of the feedback message Ma includes both the display by the display device 15 and the reproduction by the sound output device 14. In the foregoing example, attention is paid to the feedback message Ma, but the general comment message Mb of the second embodiment can also be reproduced as a voice by the sound output device 14.

Figure 6:
FIG. 6 is a partial schematic diagram of the general comment screen according to a modified example.

(6) In the second embodiment, the general comment message Mb, which represents the general comment regarding the entire musical piece, is displayed on the display device 15, but the general comment message Mb can be individually selected and displayed on the display device 15 for each of a plurality of sections of the musical piece divided on the time axis. For example, as illustrated in FIG. 6, a general comment message Mb1 is displayed for the beginning of the musical piece, a general comment message Mb2 is displayed for the middle of the musical piece, and a general comment message Mb3 is displayed for the end of the musical piece.

(7) In the embodiments described above, the indices Q (Q1-Q5) are calculated by analyzing the audio signal X output from the sound collection device 13 or the electric musical instrument, but the information used for calculating the indices Q relating to the performance of the performer P is not limited to the audio signal X. For example, the indices Q relating to the performance of the performer P can be calculated by analyzing time-series data that are output from an electronic instrument such as a MIDI instrument.

(8) In the embodiments described above, the reproduction operation is controlled so as to follow the progress of the performance position Q1, but the specific method for controlling the reproduction operation in accordance with the analysis result of the analysis processing module 21 (indices Q) is not limited to the example described above. For example, in a configuration in which the analysis processing module 21 calculates the volume of the audio signal X, the reproduction operation can be controlled such that the volume of the performance sounds of the reproduction part varies in accordance with the volume of the audio signal X.

(9) As exemplified in the above-described embodiments, the reproduction control device 100 is realized by cooperation between the electronic controller 11 and the program. The program according to a preferred aspect of the embodiments is a program that causes a computer to function as the analysis processing module 21 that analyzes the actual performance of the actual performer, the reproduction control module 22 that causes the sound output device 14 to reproduce the performance sound of the musical piece represented by the music data D and that controls the reproduction of the performance sound in accordance with the result of the analysis of the analysis processing module 21, and the output processing module 23 that outputs a message relating to the actual performance in accordance with the result of the analysis by the analysis processing module 21.

The program exemplified above can be stored on a computer-readable storage medium and installed in a computer. The storage medium is, for example, a non-transitory (non-transitory) storage medium, a good example of which is an optical storage medium, such as a CD-ROM, but can include known arbitrary storage medium formats, such as semiconductor storage media and magnetic storage media. "Non-transitory storage media" include any computer-readable storage medium that excludes transitory propagating signals (transitory propagating signal) and does not exclude volatile storage media. Furthermore, it is also possible to deliver the program to a computer in the form of distribution via a communication network.

(10) Preferred aspects of this disclosure that can be ascertained from the specific embodiments exemplified above are illustrated below.

In a reproduction control method according to one preferred aspect, an actual performance by an actual performer is analyzed, a reproduction of performance sounds of a musical piece represented by music data is controlled in accordance with the analysis result, and a message relating to the actual performance is output in accordance with the result of the analysis. By means of the aspect described above, the reproduction of the performance sounds of the musical piece is controlled in accordance with the result of analyzing the actual performance of the actual performer, and a message relating to the actual performance is output in accordance with the result of said analysis. Thus, it is possible to impart to the actual performer the feeling of performing in concert with a virtual performer.

In another preferred aspect, in the analysis of the actual performance, the position in the musical piece that is being played by the actual performer is estimated, and in the control of the reproduction, the reproduction of the performance sounds of the musical piece is controlled so as to follow the progress of the estimated position. By means of the aspect described above, since the performance sounds of the musical piece are reproduced so as to follow the progress of the position that is being played by the actual performer, the actual performer can perform the musical piece with the feeling as if a virtual performer were performing in concert with the actual performer's own performance.

In another preferred aspect, in the analysis of the actual performance, some or all of a first index indicating the position in the musical piece that is being played by the actual performer, a second index indicating the speed of the performance, a third index indicating the skill level of the performance, a fourth index indicating the temporal error between the performance and the performance sound to be reproduced, and a fifth index indicating the presence/absence of a performance mistake by the actual performer are calculated.

In another preferred aspect, it is determined whether the analysis result satisfies a prescribed condition and the message is output each time the determination result changes. By means of the aspect described above, since the message is output each time there is a change in the result regarding whether the analysis result satisfies the prescribed condition, it is possible for the performer to promptly reflect the content of the message in the performer's own performance. In a preferred example of Aspect 4, in the determination, it is determined whether indices calculated by the analysis are within prescribed ranges.

In another preferred aspect, the message represents an emotion relating to the analysis result. By means of the aspect described above, since the message representing the emotion relating to the analysis result is output, it is possible to impart to the actual performer the feeling of performing in concert with a virtual performer.

A reproduction control device according to another preferred aspect comprises an analysis processing unit that analyzes an actual performance of an actual performer, a reproduction control unit that causes a sound output device to reproduce a performance sound of a musical piece represented by music data and that controls the reproduction of the performance sound in accordance with the result of the analysis by the analysis processing unit, and an output processing unit that outputs a message relating to the actual performance in accordance with the result of the analysis by the analysis processing unit. By means of the aspect described above, the reproduction of the performance sounds of the musical piece is controlled in accordance with the result of analyzing the actual performance of the actual performer, and a message relating to the actual performance is output in accordance with the result of said analysis. Thus, it is possible to impart to the actual performer the feeling of performing in concert with a virtual performer.

In another preferred aspect, the analysis processing unit estimates the position in the musical piece that is being played by the actual performer, and the reproduction control unit causes the sound output device to reproduce the performance sounds of the musical piece so as to follow the progress of the estimated position. By means of the aspect described above, since the performance sounds of the musical piece are reproduced so as to follow the progress of the position that is being played by the actual performer, the actual performer can perform the musical piece with the feeling as if a virtual performer were performing in concert with the actual performer's own performance.

In another preferred aspect, the analysis processing unit calculates some or all of a first index indicating the position in the musical piece that is being played by the actual performer, a second index indicating the speed of the performance, a third index indicating the skill level of the performance, a fourth index indicating the temporal error between the performance and the performance sound to be reproduced, and a first index indicating the presence/absence of a performance mistake by the actual performer.

In another preferred aspect, the output processing unit determines whether the analysis result satisfies a prescribed condition and outputs the message each time the determination result changes. By means of the aspect described above, since the message is output each time there is a change in the result of whether the analysis result satisfies the prescribed condition, it is possible for the performer to promptly reflect the content of the message in the performer's own performance. In a preferred example of Aspect 9, the output processing unit determines whether indices calculated by the analysis processing unit are within the prescribed ranges.

In another preferred aspect, the message represents an emotion relating to the analysis result. By means of the aspect described above, since the message representing the emotion relating to the analysis result is output, it is possible to impart to the actual performer the feeling of performing in concert with the virtual performer.

A program according to another preferred aspect causes a computer to execute an analysis process that analyzes an actual performance of an actual performer, a reproduction control process that causes a sound output device to reproduce a performance sound of a musical piece represented by music data and that controls the reproduction of the performance sound in accordance with the analysis result by means of the analysis process, and an output process that outputs a message relating to the actual performance in accordance with the analysis result by means of the analysis process. By means of the aspect described above, the reproduction of the performance sounds of the musical piece is controlled in accordance with the result of analyzing the actual performance of the actual performer, and a message relating to the actual performance is output in accordance with the result of said analysis. Thus, it is possible to impart to the actual performer the feeling of performing in concert with a virtual performer.

What is claimed is:

1. A reproduction control method realized by a computer, comprising:
    analyzing an actual performance of an actual performer;
    controlling a reproduction of a performance sound of a musical piece represented by music data in accordance with a result of the analyzing of the actual performance; and
    outputting a message relating to the actual performance in accordance with the result of the analyzing of the actual performance,
    in the analyzing of the actual performance, a position in the musical piece that is being played by the actual performer being estimated, and
    in the controlling of the reproduction, the reproduction of the performance sound of the musical piece being controlled so as to follow a progress of the position that has been estimated.

2. The reproduction control method according to claim 1, wherein
    in the analyzing of the actual performance,
    a position index indicating the position in the musical piece that is being played by the actual performer and a speed index indicating a speed of the actual performance are calculated.

3. The reproduction control method according to claim 1, wherein
    in the analyzing of the actual performance,
    a skill level index indicating a skill level of the actual performance,
    a temporal error index indicating a temporal error between the actual performance and the performance sound of the musical piece, and
    a presence/absence index indicating a presence or absence of a mistake of the actual performance by the actual performer are calculated.

4. The reproduction control method according to claim 1, wherein
    in the outputting, determination of whether the result of the analyzing of the actual performance satisfies a prescribed condition is performed, and the message is output each time a result of the determination changes.

5. The reproduction control method according to claim 4, wherein
    in the determination, whether indices calculated by the analyzing of the actual performance are within prescribed ranges is determined.

6. The reproduction control method according to claim 1, wherein
    the message represents an emotion relating to the result of the analyzing of the actual performance.

7. A reproduction control device comprising:
    an electronic controller including at least one processor, the electronic controller being configured to execute a plurality of modules including
    an analysis processing module that analyzes an actual performance of an actual performer,
    a reproduction control module that causes a sound output device to reproduce a performance sound of a musical piece represented by music data and that controls a reproduction of the performance sound in accordance with a result of analysis by the analysis processing module, and
    an output processing module that outputs a message relating to the actual performance in accordance with the result of the analysis by the analysis processing module,
    the analysis processing module estimating a position in the musical piece that is being played by the actual performer, and
    the reproduction control module causing the sound output device to reproduce the performance sound of the musical piece so as to follow a progress of the position that has been estimated.

8. The reproduction control device according to claim 7, wherein
the analysis processing module calculates
a position index indicating the position in the musical piece that is being played by the actual performer and
a speed index indicating a speed of the actual performance.

9. The reproduction control device according to claim 7, wherein
the analysis processing module calculates
a skill level index indicating a skill level of the actual performance,
a temporal error index indicating a temporal error between the actual performance and the performance sound to be reproduced by the sound output device, and
a presence/absence index indicating a presence or absence of a mistake of the actual performance by the actual performer.

10. The reproduction control device according to claim 7, wherein
the output processing module performs determination of whether the result of the analysis satisfies a prescribed condition, and outputs the message each time a result of the determination changes.

11. The reproduction control device according to claim 10, wherein
the output processing module determines whether indices calculated by the analysis processing module are within prescribed ranges.

12. The reproduction control device according to claim 7, wherein
the message represents an emotion relating to the result of the analysis.

13. A non-transitory computer readable medium storing a program that causes a computer to execute:
an analysis process that analyzes an actual performance of an actual performer;
a reproduction control process that causes a sound output device to reproduce a performance sound of a musical piece represented by music data and that controls a reproduction of the performance sound in accordance with a result of analysis by the analysis process; and
an output process that outputs a message relating to the actual performance in accordance with the result of the analysis by the analysis process,
in the analysis process, a position in the musical piece that is being played by the actual performer being estimated, and
in the reproduction control process, the reproduction of the performance sound of the musical piece being controlled so as to follow a progress of the position that has been estimated.

14. The non-transitory computer readable medium according to claim 13, wherein
in the analysis process,
a position index indicating the position in the musical piece that is being played by the actual performer and
a speed index indicating a speed of the actual performance are calculated.

15. The non-transitory computer readable medium according to claim 13, wherein
in the analysis process,
a skill level index indicating a skill level of the actual performance,
a temporal error index indicating a temporal error between the actual performance and the performance sound of the musical piece, and
a presence/absence index indicating a presence or absence of a mistake of the actual performance by the actual performer are calculated.

16. The non-transitory computer readable medium according to claim 13, wherein
in the output process, determination of whether the result of the analysis satisfies a prescribed condition is performed, and the message is output each time a result of the determination changes.

17. The non-transitory computer readable medium according to claim 16, wherein
in the determination, whether indices calculated by the analysis are within prescribed ranges is determined.

* * * * *